UNITED STATES PATENT OFFICE.

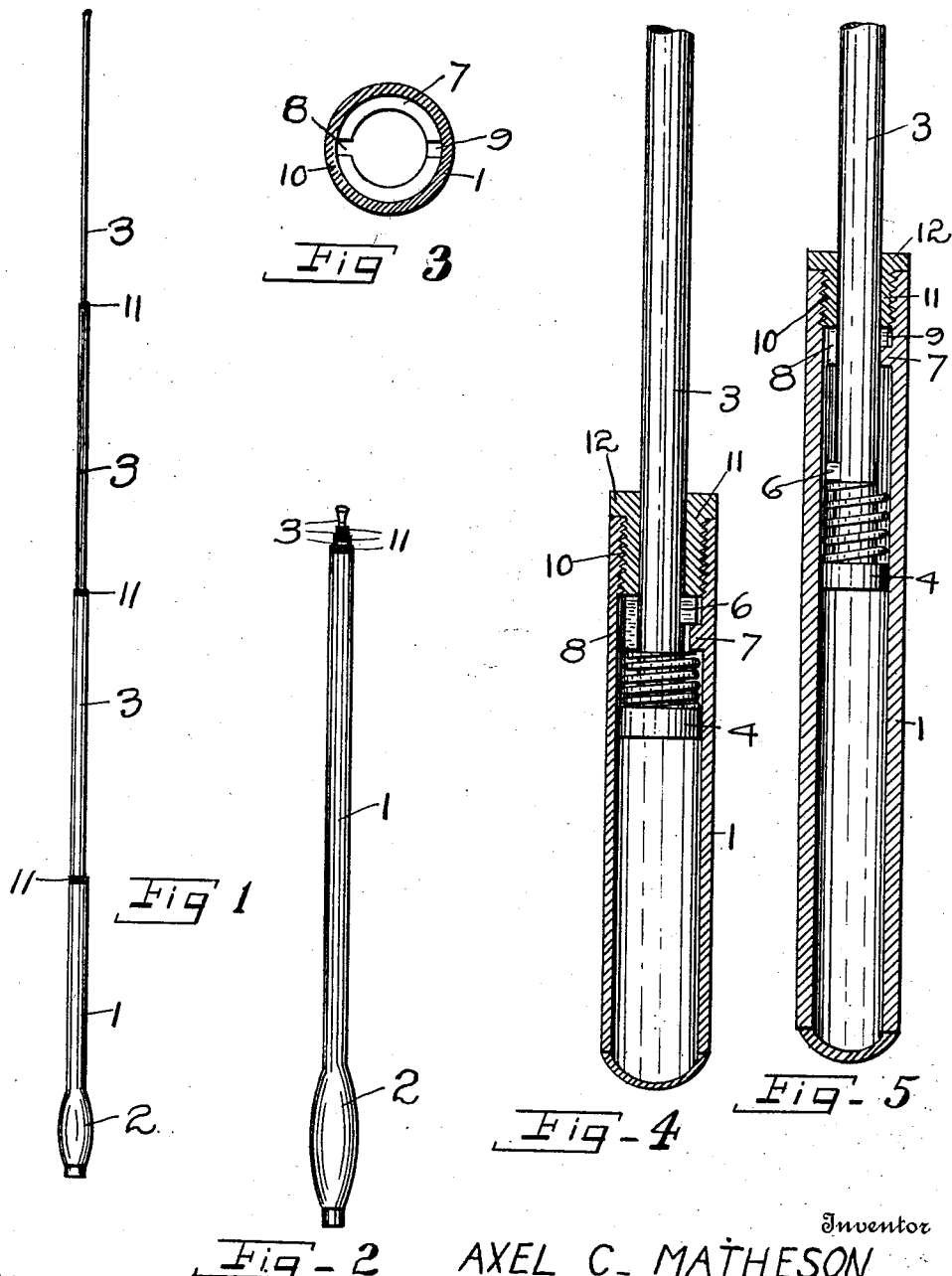

AXEL C. MATHESON, OF BANGOR, WISCONSIN.

FISHING-ROD.

1,033,430.  Specification of Letters Patent.  Patented July 23, 1912.

Application filed August 16, 1911. Serial No. 644,326.

*To all whom it may concern:*

Be it known that I, AXEL C. MATHESON, a citizen of the United States, residing at Bangor, in the county of La Crosse and State of Wisconsin, have invented certain new and useful Improvements in Fishing-Rods, of which the following is a specification.

My invention relates to improvements in fishing rods, and has particular reference to an improved form of telescoping fishing rod which may be readily packed in condensed form to facilitate carrying thereof and prevent losing of the parts.

The leading object of my invention is the provision of an improved metal fishing rod which shall be composed of a plurality of telescoping sections which may all be folded within the butt section of the fishing rod and which may be easily locked in opened position when it is desired to use the rod.

The further object of my improved fishing rod is the provision of novel and durable means for satisfactorily locking the various telescoping sections in extended position.

Other objects and advantages of my improved fishing rod will be readily apparent by reference to the following description taken in connection with the accompanying drawings and it will be understood that I may make any modifications in the specific structure shown and described within the scope of my claims without departing from or exceeding the spirit of my invention.

Figure 1 represents a view of my improved rod in extended position. Fig. 2 represents a view of the same in collapsed or telescoped position. Fig. 3 represents an end view of one of the sections. Fig. 4 represents a longitudinal sectional view of the joint showing the two sections locked in extended position, and Fig. 5 represents a fragmentary view of one of the sections illustrating the construction of the basal end thereof.

In the drawings, the numeral 1 designates the main or butt section of my improved fishing rod, said section having at the lower end thereof the handle or grip portion 2 and having slidably engaged therein one of the plurality of tubular telescoping rod sections 3. Said sections 3, as is most clearly shown in Fig. 5, have an enlarged peripheral basal flange portion 4 and have wound thereon adjacent the portion 4 the helical spring 5 whose movement along the section 3 is limited by the outwardly projecting lug 6 of each of said sections. Each of the telescoping sections 3 and also the main section 1 is formed with the inwardly extending peripheral rib 7 of about double the width of the lug 6, while formed in the said rib is a slot 8 of the same width as the lug 6 and extending entirely across the rib a second slot or recess 9 being formed in the diametrically opposite portion of the rib extending inward from the outer edge thereof.

In the use of my telescoping rod, I place the various sections within each other, the basal flange of said sections being of size to just slide within the inclosing tubular section, and the spring 5 having one end bearing against the flange and the other adapted to engage the inner edge of the rib 7 as the two sections are moved to extend the rod. To extend the rod, I move the sections relative to each other until the lug 6 may be slid outward through the slot 8, this movement compressing the spring 5. The lug 6 being outwardly moved, I relatively rotate the two sections a half turn when the lug 6 will drop into the recess 9 and be held there by the spring 5.

To more securely lock the various parts in extended position, I form each tubular section with the threads 10 at the end adjacent the rib and provide the bushing members 11 which are exteriorly threaded and have a smooth bore to fit over the tubular section sliding within the one into which they are screwed, said bushings having an enlarged knurled portion 12 fitting against the end of the section into which they are screwed and facilitating the loosening thereof.

By reference to the drawings, it will be observed that in order to move the lug entirely through the slot 8 it is necessary to loosen the bushing 11 which normally fits against the outer face of the rib. The section having been then shifted and turned to cause the lug to lie within the recess in the rib, I again tighten the bushing which securely locks the lug within the recess to prevent any possible disengagement of the parts.

From the foregoing description taken in connection with the accompanying drawings the construction and use of my improved telescoping fishing rod will be readily understood, and it will be seen that I have provided a thoroughly practical and efficient device of this character which may be readily extended or collapsed and in which the parts will be satisfactorily fastened in extended position to prevent accidental collapsing of the rod.

I claim:

1. A joint for fishing rods, comprising a tubular section, a second section adapted to fit within the first, the first section having a recessed rib and the second section having a lug for engagement in the recess of the rib, and a threaded bushing surrounding the second section and screwed into the first to lock the lug within the recess of the rib.

2. A joint for fishing rods, comprising a pair of telescoping members, one of said members having a recessed rib and the other member having a lug for engagement in the recess of the rib, a spring for yieldingly holding the lug within the recess, and means for positively locking the lug within the said recess.

3. A joint for fishing rods, comprising telescoping sections, one of said sections having an inwardly extending rib and the other section having an outwardly extending flange, said rib having a slot formed in one side and having a recess formed in the outer face of the other side, the other section having a lug adapted to pass through the slot and to fit into the recess, a spring bearing against the rib and flange to force the same apart and yieldingly hold the lug in the recess, and a bushing screwed into the outer section and bearing against the rib to lock the lug within the recess of the rib.

In testimony whereof I affix my signature, in the presence of two witnesses.

AXEL C. MATHESON.

Witnesses:
CHARLES SCAFE,
WM. KORTHELS.